(12) United States Patent
Cool

(10) Patent No.: US 6,334,408 B1
(45) Date of Patent: Jan. 1, 2002

(54) MARKING RESTRAINT DEVICE FOR ANIMALS

(76) Inventor: Lewis E. Cool, 815 47th St., W., Bradenton, FL (US) 34209

( * ) Notice: Subject to any disclaimer, the term of this patent is extended or adjusted under 35 U.S.C. 154(b) by 0 days.

(21) Appl. No.: 09/501,398

(22) Filed: Feb. 10, 2000

(51) Int. Cl.⁷ .............................................. A01K 37/00
(52) U.S. Cl. ...................................................... 119/712
(58) Field of Search ................................. 119/712, 725, 119/653, 650, 654, 868

(56) References Cited

U.S. PATENT DOCUMENTS

| | | | |
|---|---|---|---|
| 2,173,356 A | * 9/1939 | Cross | 119/654 |
| 3,817,217 A | 6/1974 | Matuka et al. | 119/95 |
| 4,103,645 A | 8/1978 | Tyler | 119/95 |
| 4,184,452 A | * 1/1980 | Buzzell et al. | 119/654 |
| 4,366,777 A | * 1/1983 | Akhavein et al. | 119/712 |
| 4,510,887 A | 4/1985 | Lincoln et al. | 119/95 |
| 4,562,794 A | * 1/1986 | Speckman | 119/712 |
| 4,813,949 A | 3/1989 | O'Rourke | 604/391 |
| 4,900,876 A | * 2/1990 | Bushman et al. | 119/654 |
| 4,917,683 A | 4/1990 | Thompson | 604/387 |
| 4,930,451 A | * 6/1990 | Miller et al. | 119/654 |
| 5,234,421 A | 8/1993 | Lowman | 604/385.1 |
| 5,465,689 A | * 11/1995 | Winder | 119/654 |
| 5,555,848 A | * 9/1996 | Trujillo et al. | 119/654 |
| 5,980,496 A | * 11/1999 | Jacobsen et al. | 604/289 |

\* cited by examiner

Primary Examiner—Charles T. Jordan
Assistant Examiner—Judith A. Nelson
(74) Attorney, Agent, or Firm—Joseph N. Breaux

(57) ABSTRACT

An animal marking restraint device that is positioned over the animal to prevent the animal from marking while in the house. The animal marking restraint device has an outwardly facing surface impregnated with a bitter chemical such as quinine to prevent the animal from chewing and tearing at the device an inwardly facing animal contact surface impregnated with a flea power formulation to prevent flea infestation of the animal.

1 Claim, 3 Drawing Sheets

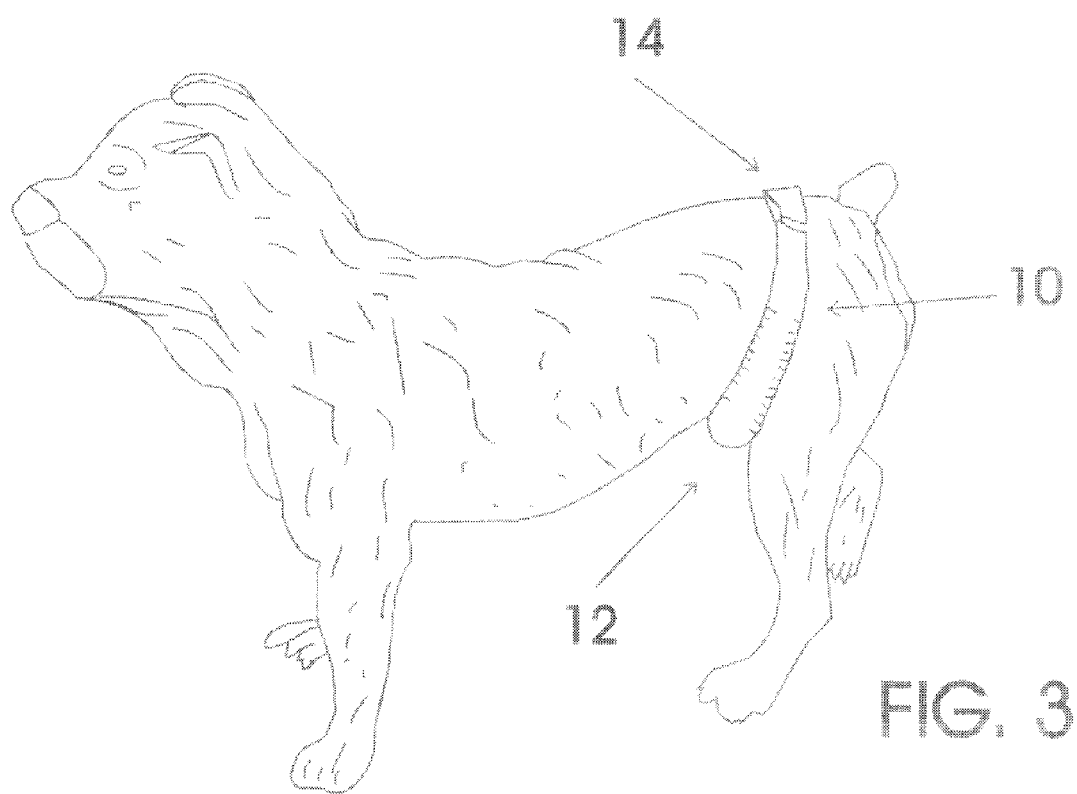

US 6,334,408 B1

MARKING RESTRAINT DEVICE FOR ANIMALS

TECHNICAL FIELD

The present invention relates to animal care products and more particularly to a marking restraint device for animals that includes an elliptical shaped, breathable fabric pad member and a connecting strap assembly; the elliptical shaped, breathable fabric pad member having a center area formed on a flea powder impregnated animal contact surface of the pad member of a higher absorbency than the remainder of the pad member and an outwardly facing pad member surface impregnated with a bitter tasting chemical; the connecting strap assembly having two connecting straps; each connecting strap having a first end formed in connection with one of two opposite pad ends of the pad member and a second end provided with one half of a two-part fastener mechanism.

BACKGROUND ART

Many animal lovers are unable to have their pets in the house because the animal has not been trained to not mark in the house. It would be a benefit to these individuals to have an animal marking restraint device that could be positioned over the animal to prevent the animal from marking while in the house. Because the animal can chew and tear at the marking restraint device rendering it ineffective, it would be a further benefit to have an animal marking restraint device that had an outwardly facing surface impregnated with a bitter chemical such as quinine. Because covered areas of the animals can provide a haven for fleas, it would be a still further benefit to have an animal marking restraint device having an animal contact surface impregnated with a flea power formulation.

GENERAL SUMMARY DISCUSSION OF INVENTION

It is thus an object of the invention to provide a marking restraint device for animals that includes an elliptical shaped, breathable fabric pad member and a connecting strap assembly; the elliptical shaped, breathable fabric pad member having a center area formed on a flea powder impregnated animal contact surface of the pad member of a higher absorbency than the remainder of the pad member and an outwardly facing pad member surface impregnated with a bitter tasting chemical; the connecting strap assembly having two connecting straps; each connecting strap having a first end formed in connection with one of two opposite pad ends of the pad member and a second end provided with one half of a two-part fastener mechanism.

Accordingly, a marking restraint device for animals is provided. The marking restraint device for animals includes an elliptical shaped, breathable fabric pad member and a connecting strap assembly; the elliptical shaped, breathable fabric pad member having a center area formed on a flea powder impregnated animal contact surface of the pad member of a higher absorbency than the remainder of the pad member and an outwardly facing pad member surface impregnated with a bitter tasting chemical; the connecting strap assembly having two connecting straps; each connecting strap having a first end formed in connection with one of two opposite pad ends of the pad member and a second end provided with one half of a two-part fastener mechanism.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a perspective view showing the exemplary marking restraint device for animals of FIG. 1 in use on a representative dog.

EXEMPLARY MODE FOR CARRYING OUT THE INVENTION

Figure 1:
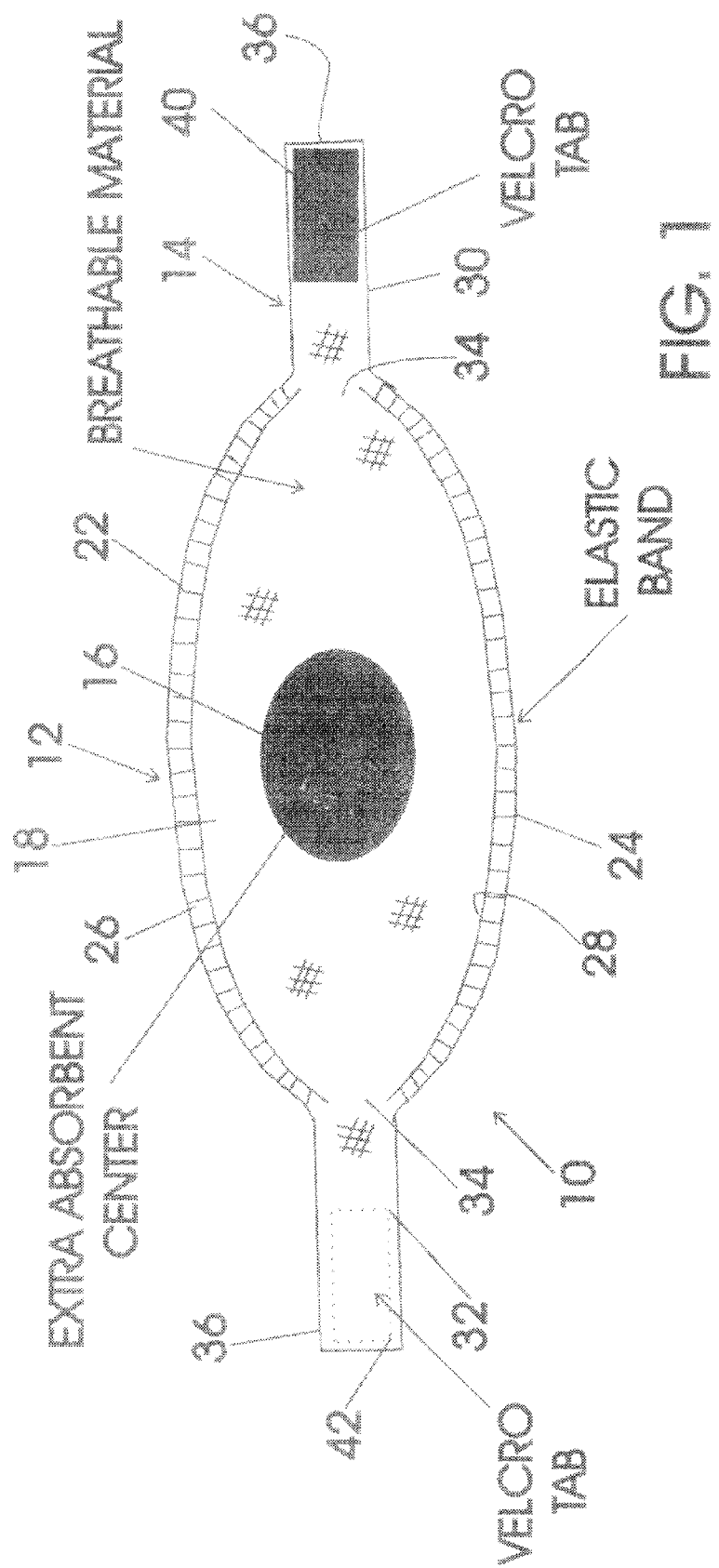
FIG. 1 is a plan view of an exemplary embodiment of the marking restraint device for animals of the present inventions showing the elliptical shaped, breathable fabric pad member having a center area of a higher absorbency than the remainder of the pad member formed on a flea powder impregnated animal contact surface of the pad member and outwardly facing pad member surface impregnated with a bitter tasting chemical such as quinine; and a connecting strap assembly having two connecting straps, each having a first end formed in connection with an opposite end of the pad member and a second end provided with one half of a two-part fastener mechanism.
Figure 2:
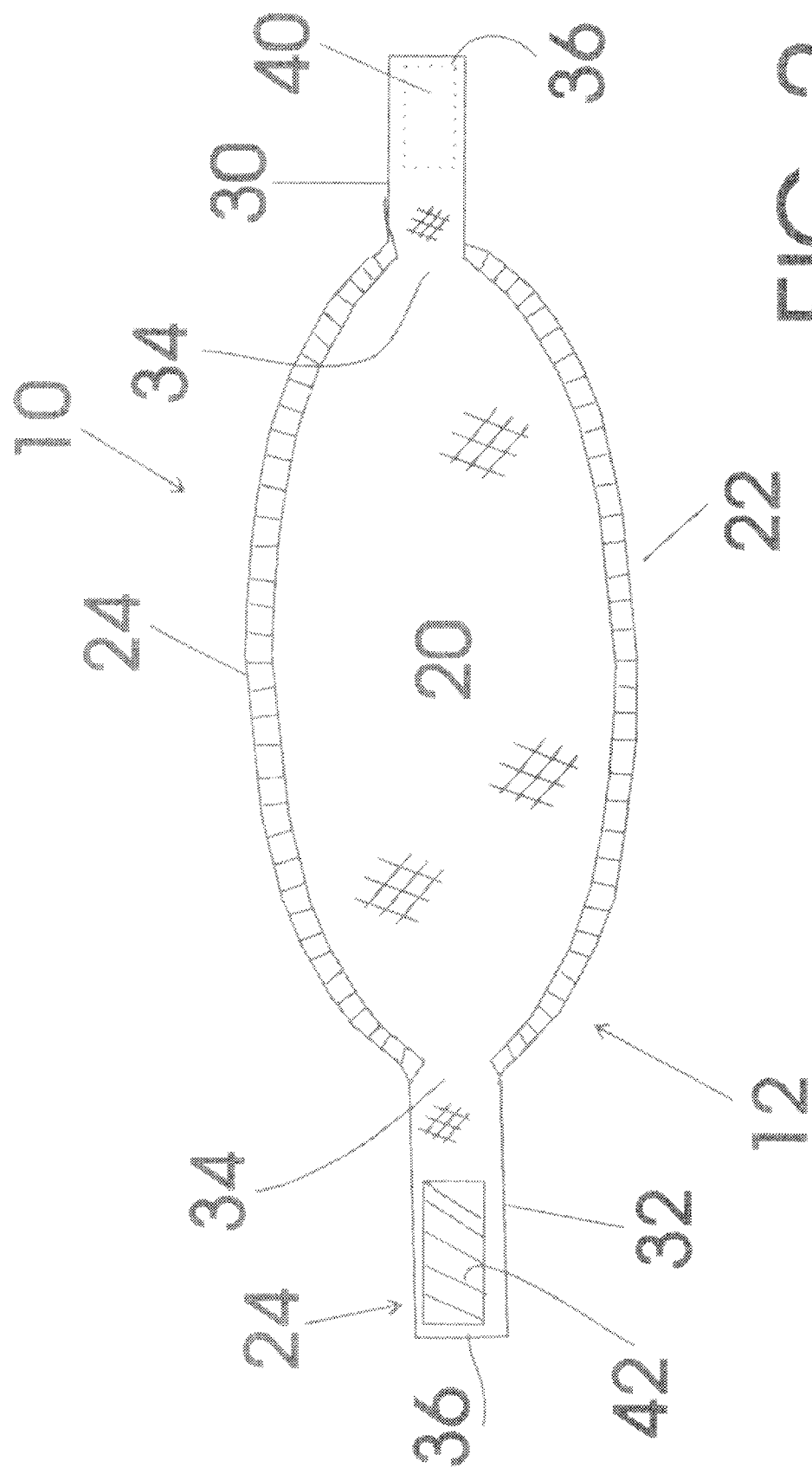
FIG. 2 is a plan view of the outwardly facing pad member surface of the exemplary marking restraint device of FIG. 1.

FIGS. 1–3 show various aspects of an exemplary embodiment of the marking restraint device for animals of the present invention generally designated 10. Marking restraint device for animals 10 is disposable and includes an elliptical shaped, breathable fabric pad member, generally designated 12, and a connecting strap assembly, generally designated 14.

Elliptical shaped, breathable fabric pad member 12 has a center area 16 formed on a flea powder impregnated animal contact surface 18 of pad member 12 that is of a higher absorbency than the remainder of pad member 12 and an outwardly facing pad member surface 20 impregnated with quinine. Opposed perimeter side edges 24 of pad member 12 are attached to lengths of elastic material 26,28.

Connecting strap assembly 14 has two connecting straps 30,32. Each connecting strap 30,32 has a first end 34 integrally formed in connection with one of two opposite pad ends of pad member 12 and a second end 36 provided with one half 40,42, respectively, of a two-part hook and pile fastener mechanism.

It can be seen from the preceding description that a marking restraint device for animals has been provided.

It is noted that the embodiment of the marking restraint device for animals described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A marking restraint device for animals comprising:

an elliptical shaped, breathable fabric pad member; and a connecting strap assembly;

said elliptical shaped, breathable fabric pad member having a center area formed on a flea powder impregnated animal contact surface of said pad member of a higher absorbency than said remainder of said pad member and an outwardly facing pad member surface impregnated with a bitter tasting chemical;

said connecting strap assembly having two connecting straps;

each connecting strap having a first end formed in connection with one of two opposite pad ends of said pad member and a second end provided with one half of a two-part fastener mechanism;

two perimeter edges of said pad member having elastic material provided in connection therewith.

* * * * *